United States Patent
Horng et al.

(10) Patent No.: US 6,927,949 B2
(45) Date of Patent: Aug. 9, 2005

(54) SPIN VALVE HEAD WITH REDUCED ELEMENT GAP

(75) Inventors: Cheng T. Horng, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 19 days.

(21) Appl. No.: 10/614,927

(22) Filed: Jul. 8, 2003

(65) Prior Publication Data

US 2004/0021991 A1 Feb. 5, 2004

Related U.S. Application Data

(62) Division of application No. 09/756,009, filed on Jan. 8, 2001, now Pat. No. 6,714,387.

(51) Int. Cl.$^7$ .................................................. G11B 5/39
(52) U.S. Cl. .................... 360/320; 360/324; 360/324.1; 360/324.12; 29/603.14; 29/603.15
(58) Field of Search .................................. 360/320, 321, 360/322, 324, 324.1, 324.11, 324.12; 29/603.07, 603.13

(56) References Cited

U.S. PATENT DOCUMENTS

| 5,302,461 A | | 4/1994 | Anthony ..................... 428/472 |
| 5,432,734 A | | 7/1995 | Kawano et al. ............. 365/158 |
| 5,919,581 A | | 7/1999 | Yamamoto et al. ....... 428/694 T |
| 5,997,698 A | * | 12/1999 | Mino et al. ............... 204/192.2 |
| 5,999,379 A | | 12/1999 | Hsiao et al. ................. 360/113 |
| 6,452,757 B1 | * | 9/2002 | Yang et al. ................. 360/317 |
| 6,466,418 B1 | * | 10/2002 | Horng et al. .......... 360/324.12 |

* cited by examiner

Primary Examiner—William Korzuch
Assistant Examiner—Christopher R. Magee
(74) Attorney, Agent, or Firm—George O. Saile; Stephen B. Ackerman (57) ABSTRACT

This invention teaches a way for the shield to shield (S1–S2) distance of a magnetic read head to be reduced. The key feature is that the upper and lower dielectric layers D1 and D3, which are normally pure aluminum oxide, have each been replaced by a bilayer dielectric, which consists of aluminum oxide in contact with the shield layer followed by a layer of a high voltage breakdown material. For D1 this layer may be either tantalum oxide or tantalum nitride while for D3 our preferred material has been tantalum oxide. The addition of the two high breakdown layers allows the thickness of the upper and lower dielectric layers to be reduced without having to reduce the S2—S2 voltage difference.

8 Claims, 6 Drawing Sheets

SPIN VALVE HEAD WITH REDUCED ELEMENT GAP

This is a division of patent application Ser. No. 09/756,009, filing date Jan. 8, 2001 now U.S. Pat. No. 6,714,387, Spin Valve Head With Reduced Element Gap, assigned to the same assignee as the present invention.

FIELD OF THE INVENTION

The invention relates to the general field of magnetic read heads with particular reference to GMR structures for use in reading data recorded at densities in the 100 Gb per sq. in. range.

BACKGROUND OF THE INVENTION

Requirements on transducers for ultra-high recording densities (greater than 60 Gb/in$^2$) place certain constraints on the properties of the read and write heads needed to achieve this. These fundamental constraints have a profound influence on the design and fabrication of the read/write transducers. To achieve extremely high recording densities, Giant Magnetoresistance (GMR) reader design has to be capable of very high linear bit density (BPI) and also very high track density (TPI). Consequently, GMR devices continue to be pushed to narrower track widths and to thinner free layers to maintain high signal output in spite of reductions in track width and reduced gap length.

Ultra-thin free layers as well as MR ratios are very effective to obtain high signal output. Ultra-thin free layers having moments equivalent to 37 Å NiFe (20 Å CoFe) made of a composite CoFe—NiFe—Cu layer, is capped with 10—20 Å Ta or TaO. The large GMR ratio obtained from such a very thin free layer is due to: (a) the Cu HCL (high conductivity layer) which improves the mean free path of a spin-up electron and maintains the mean free path difference between spin-up and spin-down electrons, and, (b) the bottom spin valve structure which provides very good specular reflection at the Ru/CoFe and CoFe—NiFe—Cu (free layer)/Ta or TaO interfaces.

There are other features that make the bottom spin valve most suitable for extremely high recording densities. It is shown that the thin free layer of the bottom spin valve is magnetically softer than that of the top spin valve. GMR magnetostriction in the top spin valve increases asymptotically with the reduced free layer thickness. For the bottom spin valve, the magnetostriction can be attenuated by increasing the CoFe thickness in a CoFe—NiFe composite free layer. A thicker CoFe also improves the GMR ratio (Dr/r). One unique feature for the bottom spin valve is that the sensor longitudinal biasing can be made by a patterned exchange bias.

Spin valves with contiguous hard bias to achieve sensor stability are known to suffer amplitude loss due to the field originating from the hard bias structure. One approach that has been proposed to overcoming some of the amplitude loss and stability concerns has been to use a lead overlay design. In lead overlay design, MR sensor track width is defined by conductor lead edge while the contiguous hard bias junction is placed outside the conductor lead. The overlap length between the lead overlay and the hard bias junction should be less than 0.1 microns. This requirement imposes a great challenge to the photo-lithography.

Figure 1:
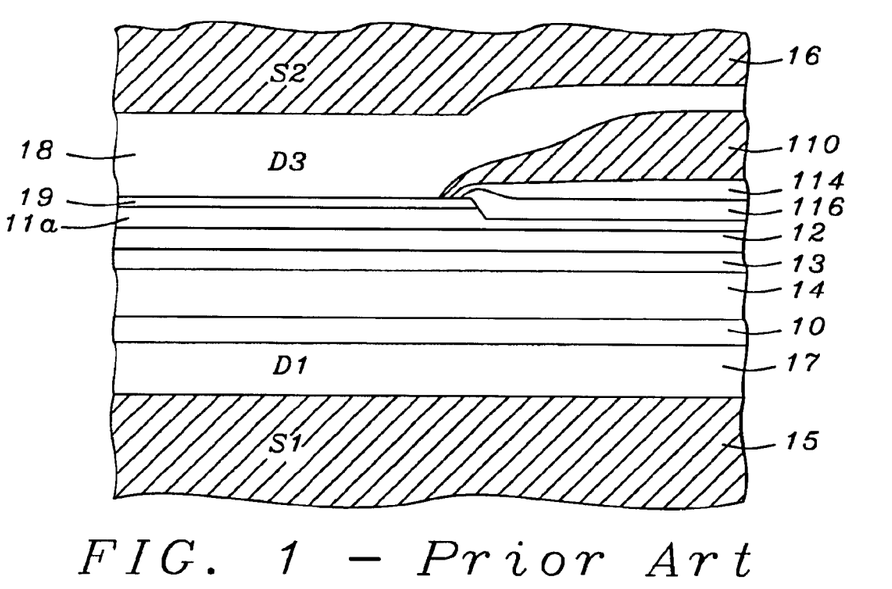
FIG. 1 illustrates a bottom spin valve structure of the prior art

An example of a bottom spin valve structure that is typical of the prior art is shown in cross-section in FIG. 1. Seen there is bottom magnetic shield 15 (commonly referred to as S1) which is coated with lower dielectric layer 17 (and commonly referred to as D1). Over this is seed layer 10 (typically nickel-chromium) which is, in turn, coated with pinning (antiferromagnetic) layer 14. Layer 13 is the pinned layer and layer 12 is the non-magnetic, electrically conductive layer. Layer 11a is the free layer, layer 11b being formed of the same material as layer 11a. Layer 19 is a capping layer while layer 114 is an antiferromagnetic layer that serves to provide longitudinal bias to the spin valve.

Continuing with FIG. 1, layer 110 is conductive material that serves for the formation of leads to the device. Layer 18 is the upper dielectric layer (commonly referred to as D3). Finally, layer 16 is the upper magnetic shield, which is commonly referred to as S2.

One key factor to improving BPI is to reduce the reader gap length (commonly called the shield-to-shield spacing). This is equal to the distance between S1 and S2 within the GMR sensor area in FIG. 1. For a 100 Gb/in$^2$ recording density design, the sensor track width is 0.1 microns, and the gap length (S1/S2) is around 600 Å. For a 300 Å thick GMR stack, even for a very thin D1 (about 140 Å), D3 is less than 160 Å thick. The greatest concern with a very thin dielectric D1/D3 layer is (a) sensor to shield shorts and (b) dielectric breakdown.

A routine search of the prior art was performed with the following references of interest being found:

In U.S. Pat. No. 5,302,461, Anthony shows dielectric layers for MR heads including oxides of Ta, Hf, Zr, Y, Ti or Nb. The invention pertains to an MR (as opposed to a GMR) read head. The metal is deposited directly onto the MR plates and then allowed to oxidize.

Yamamoto et al. in U.S. Pat. No. 5,919,581 show a MR with a shield layer. Hsiao et al. in U.S. Pat. No. 5,999,379 and Kawano et al. in U.S. Pat. No. 5,432,734 disclose other MR structures with dielectric layers.

SUMMARY OF THE INVENTION

It has been an object of the present invention to provide a bottom spin valve magnetic read head suitable for use with ultra-high recording densities, typically about 100 Gb/in$^2$, Another object of the invention has been that the separation between the magnetic shields S1 and S2 be less than 700 Angstroms while withstanding electrostatic breakdown between the GMR sensor and the shields.

These objects have been achieved in a Spin Valve structure that is a spin-filter, synthetic antiferromagnet bottom spin valve. A key novel feature is that the upper and lower dielectric layers D1, and D3, which are normally pure aluminum oxide, have each been replaced by a bilayer dielectric, each of which consists of aluminum oxide in contact with the shield layer and a layer of a high voltage breakdown material. For D1 this layer may be either tantalum oxide or tantalum nitride while for D3 our preferred material has been tantalum oxide. The addition of the two high breakdown layers allows the thickness of the upper and lower dielectric layers to be reduced without increasing the incidence of shorts associated with dielectric breakdown in D1 and/or D3.

DESCRIPTION OF THE PREFERRED EMBODIMENTS

The present invention teaches how the S1–S2 distance may be reduced without increasing the incidence of shorts associated with dielectric breakdown in D1 and/or D3. We will describe the invention in terms of a process for its manufacture. As a result of this description the structure of the present invention will also become clear. It is important to note that the various thicknesses specified in the claims are critical, as opposed to optimal, so that a structure having the same sequence of layers, but one or more thicknesses outside the specified ranges, will not operate properly.

Figure 2:
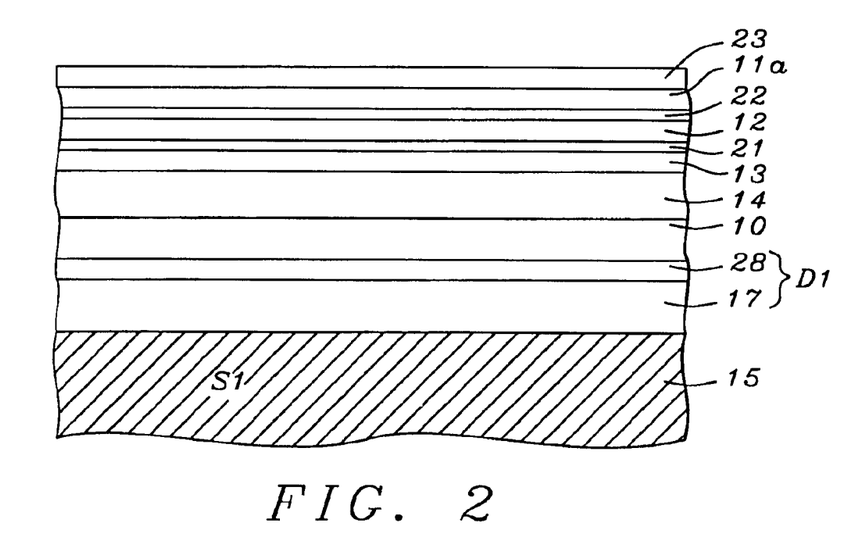
FIG. 2 illustrates initial steps for the process of the present invention.

Referring now to FIG. 2, the process begins with the provision of S1, lower magnetic shield layer 15. On this is deposited layer of aluminum oxide 17 to a thickness between about 80 and 120 Angstroms.

Now follows a key feature of the invention. Layer 28, made of a material having a dielectric breakdown voltage that is at least 5 times that of aluminum oxide, is deposited onto layer 17. Its thickness is between about 40 and 60 Angstroms. We have preferred to use one of two materials for layer 28. These are tantalum nitride, which is deposited by reactive sputtering of a tantalum target in an argon/nitrogen mix, or tantalum oxide which is formed by first sputter-depositing a tantalum film, between about 15 and 25 Å thick, which is subsequently converted to tantalum oxide by plasma oxidation (in-situ). The resulting insulating layer is both amorphous and pore-free (the latter quality being due to volume expansion during oxidation). Note that the invention is not restricted to tantalum oxide/nitride. Other high breakdown dielectrics such as aluminum nitride or zirconium oxide could be substituted for them without affecting the workability of the invention.

Layers 17 and 28 together now constitute lower dielectric layer D1 whose total thickness is less than about 150 Angstroms while its breakdown voltage is anticipated to be several times that of pure aluminum oxide of the same thickness.

Continuing our reference to FIG. 2, seed layer 10 of nickel-chromium is then deposited onto layer 28. This is followed by the deposition onto layer 10 of a synthetic antiferromagnetic structure which is a four layer laminate of about 150 Å of manganese platinum (layer 14), about 15 Å of cobalt iron (layer 13), about 7.5 Å of ruthenium (layer 21), and about 20 Å of cobalt iron (layer 12).

Layer 22, a layer of non-magnetic material such as copper, is then deposited onto layer 12, followed by the deposition of free layer 11a. The latter is shown in the figure as a single layer although it is actually a three layer laminate consisting of 5–10 Å Cu (as a high conductivity layer or HCL) on 20 Å of nickel iron on 8 Å of cobalt iron.

Next, free layer 11a is deposited followed by tantalum capping layer 23 which is about 20 Å thick. The spin filter bottom spin valve structure is thus formed.

Figure 3:
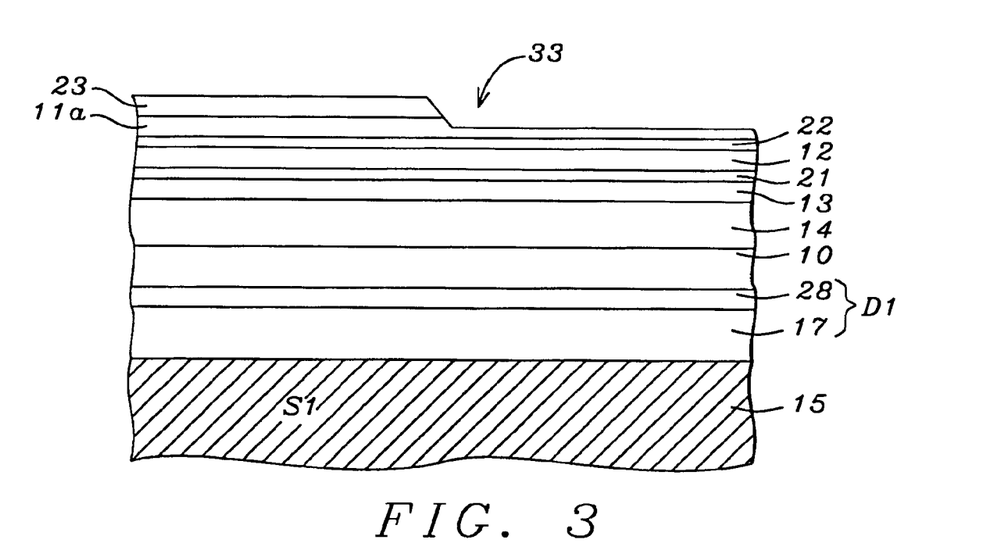
FIGS. 3–5 show deposition of successive layers that will result in the formation of longitudinal bias leads.
Figure 4:
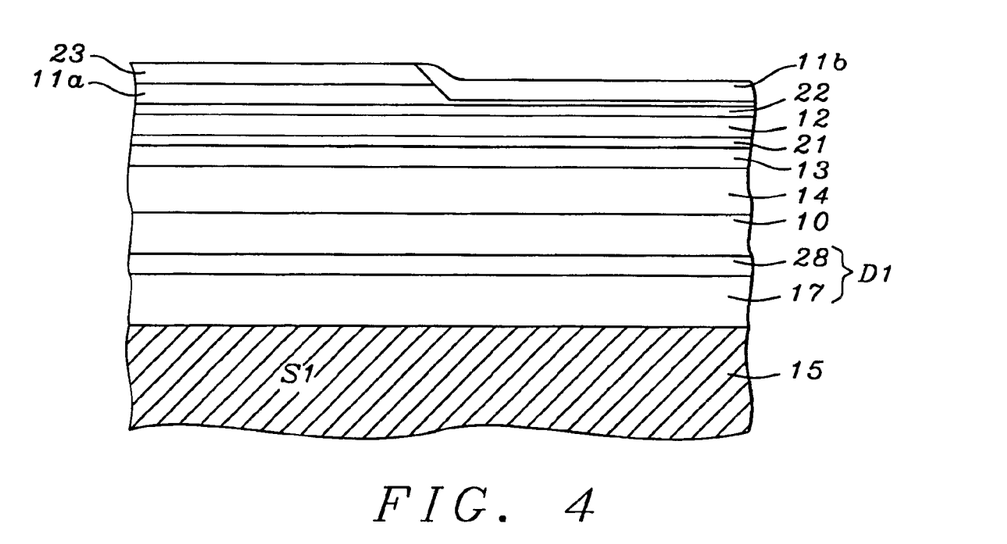

Referring now to FIG. 3, the structure of FIG. 2 is patterned and etched to form a pair of parallel trenches 33. For convenience, only the right hand member of the pair is shown. A fuller visualization of the structure may be obtained by jumping ahead to FIG. 8 which shows both sides of the structure. As can be seen, trenches 33 extend part way down into the NiFe free layer 11a. This is followed by the selective deposition in trench 33 of layer 11b which is made of the same material (i.e. NiFe or CoFe) as was used to form free layer 11a, as shown in FIG. 4. Selective deposition was achieved by using a liftoff process.

Figure 5:
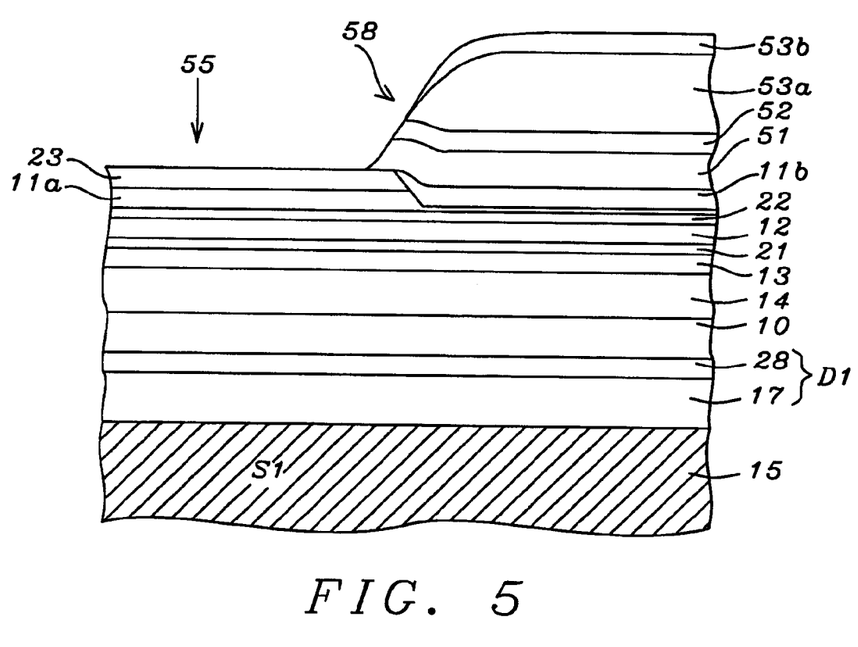

Referring now to FIG. 5, layer of antiferromagnetic material 51 was then deposited over the structure with seed layer 52, of nickel-chromium, then being deposited thereon. Note that layer 51 slightly overlaps both free layer 11a and layer 11b, which combination results in a longitudinal bias being applied at the ends of free layer 11a. This was followed by the deposition of conductive layer 53a of copper or gold which is further capped with 20–30 Å tantalum layer 53b. After lifting off the resist pattern, as seen in FIG. 5, a bottom spin valve with longitudinally patterned exchange bias 51 and conductive lead 53 has been formed.

Figure 6:
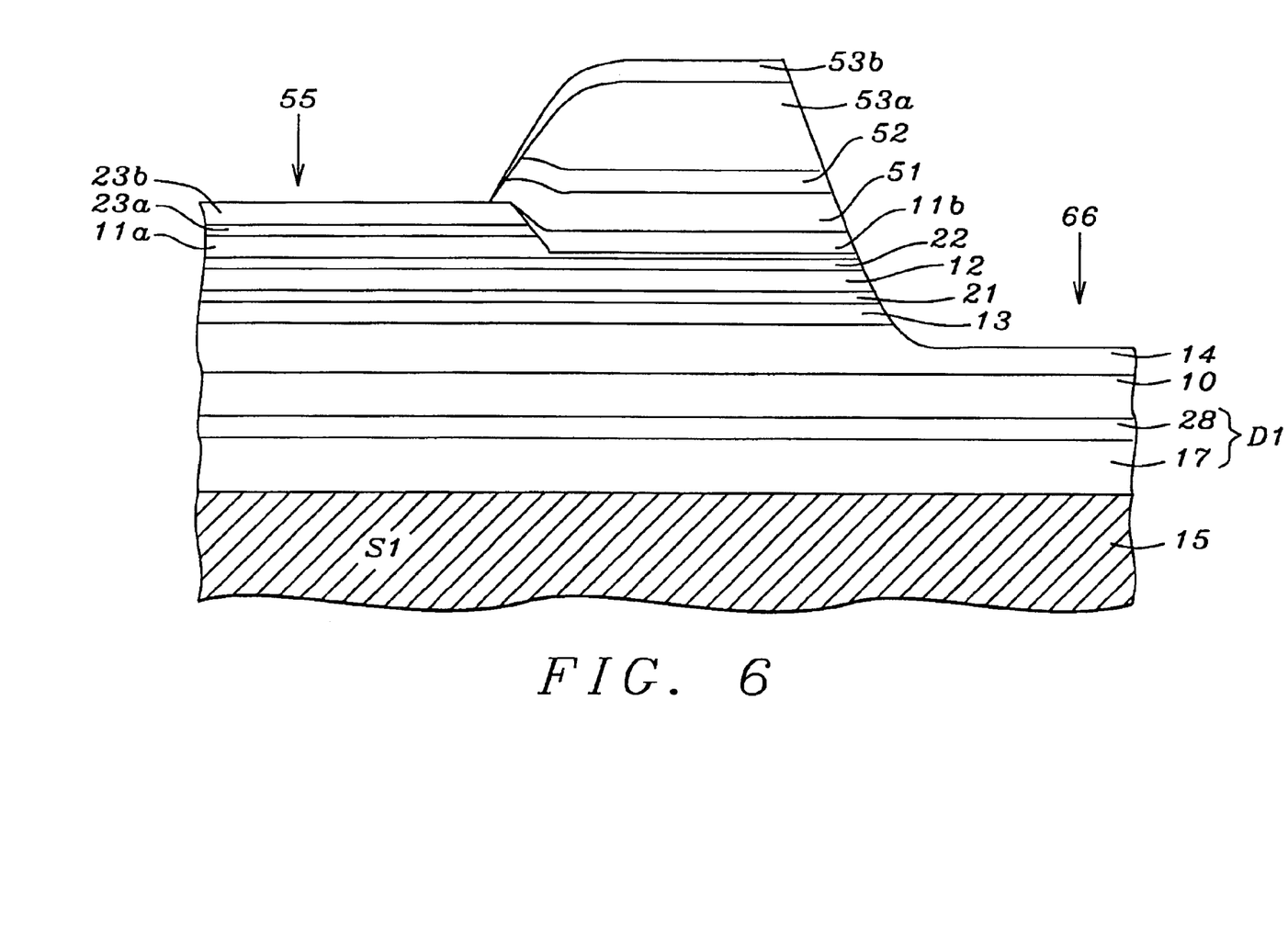
FIG. 6 shows formation of a trench that will house the conductive leads.
Figure 7:
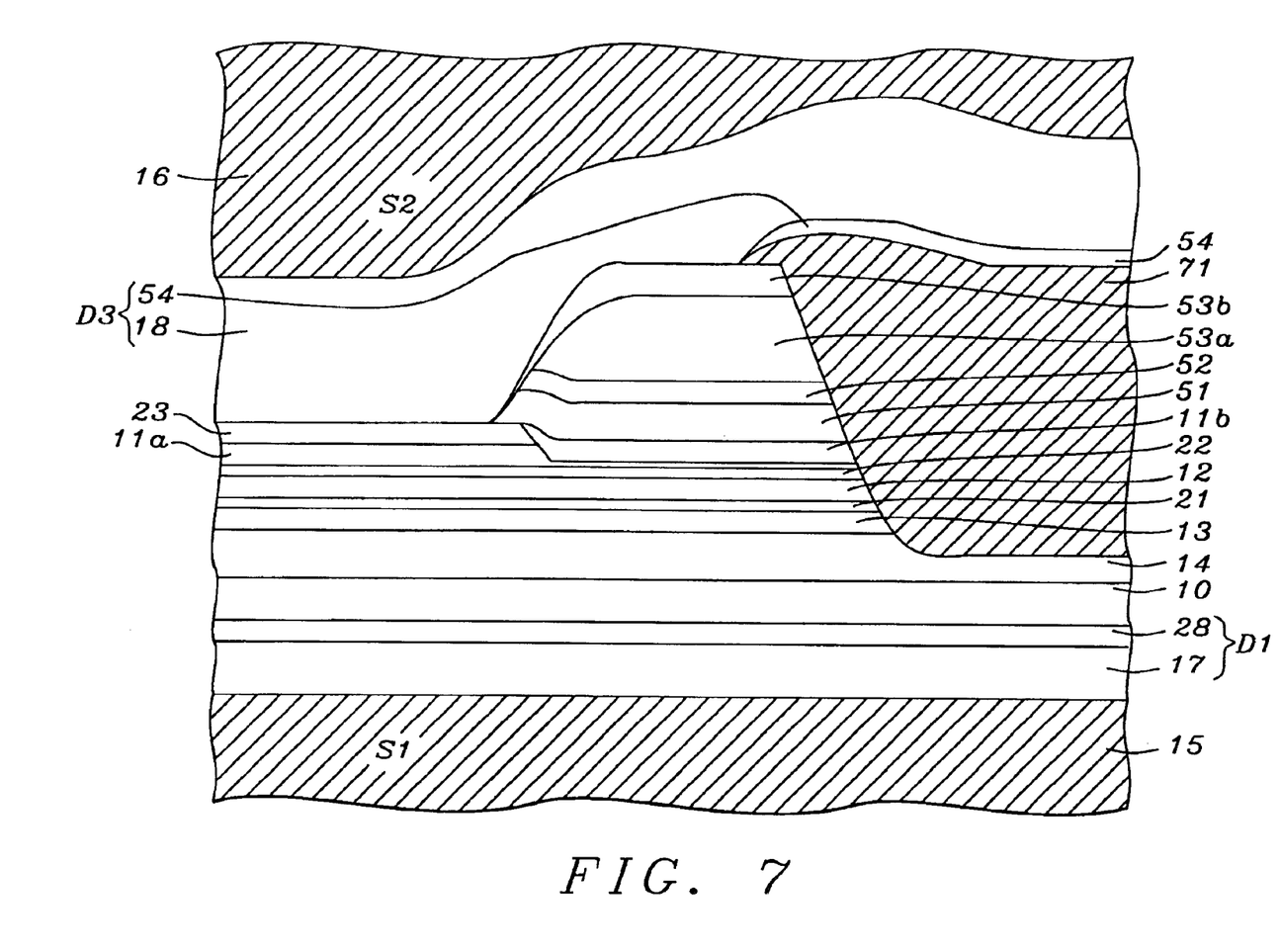
FIG. 7 shows the completed structure, including the upper dielectric and magnetic shield layers.

The next step, as shown in FIG. 6, was to form a resist liftoff pattern for use to form another pair of trenches 66, which run parallel to the other trenches and are located near the outer edges of the structure. As can be seen, these extend downwards, penetrating for some distance into manganese-platinum layer 14. FIG. 7 illustrates the final steps of the process. These are the filling of trenches 66 with any one of several possible materials 71 which would be suitable for use as conductive leads.

Figure 8:
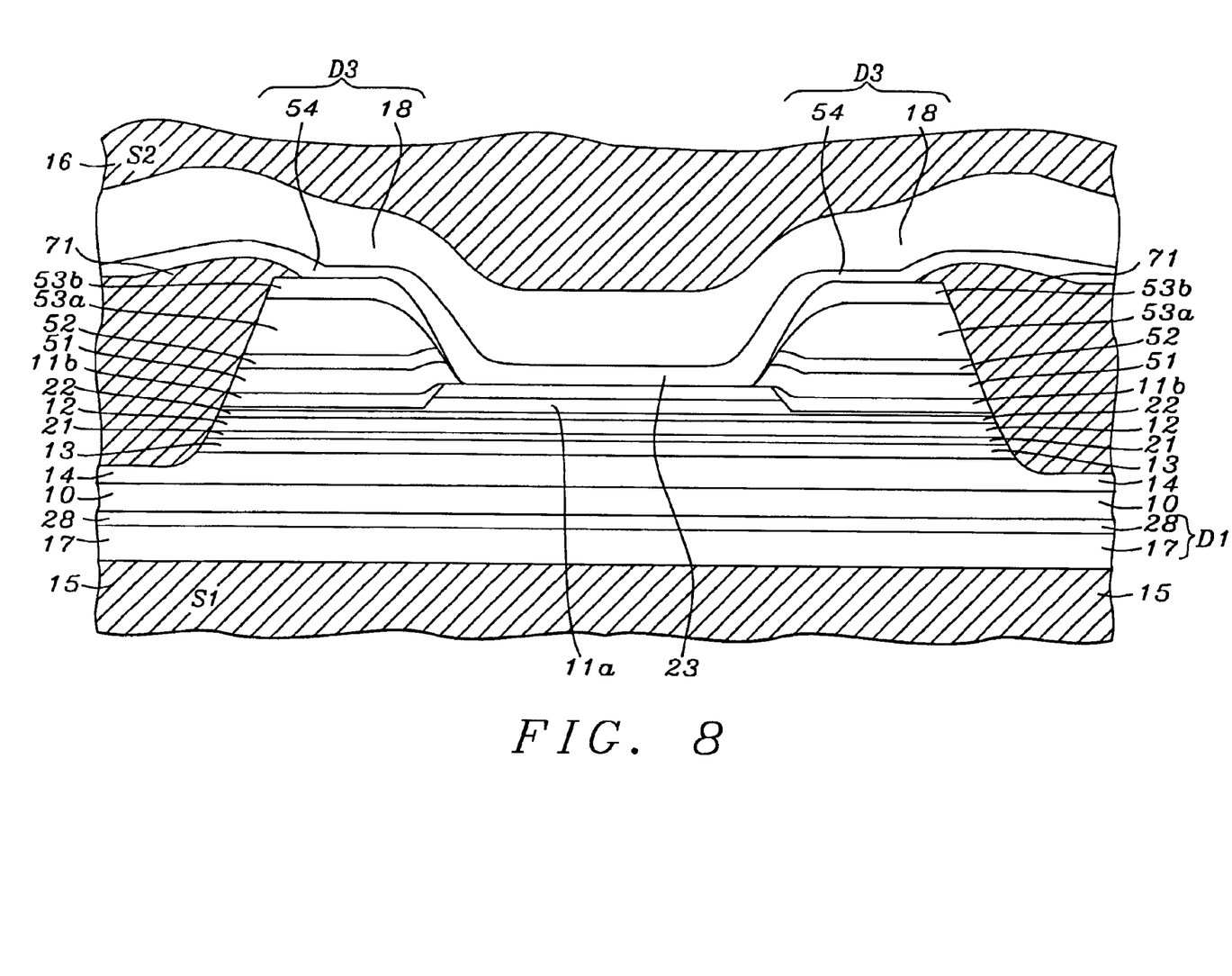
FIG. 8 shows both edges of the completed structure.

FIG. 8 illustrates a key step in the process, namely the formation of second high breakdown voltage layer 54. Our preferred way of achieving this has been to repeat the procedure used to form layer 28 (when tantalum oxide was selected) namely to deposit layer of tantalum between about 20 and 25 Angstroms thick and to then convert it to tantalum oxide by means of plasma oxidation, making layer 54 between about 50 and 60 Angstroms thick.

This is followed by the deposition over the entire structure of second aluminum oxide layer 18 to a thickness between about 80 and 120 Angstroms. Layers 18 and 54 together constitute upper dielectric layer D3.

The final step in the process of the present invention is the deposition of ferromagnetic layer 16 which will serve as upper magnetic shield S2. The application of this process has led to a structure in which the separation between its upper and lower magnetic shields is less than 700 Angstroms.

Experimental Confirmation

Spin-filter bottom spin valve having the following structures have been made:

20 Å Ta/OL/15 Å Ta/65 Å NiCr/150 Å MnPt/18 Å CoFe/7.5 Å Ru/23 Å

CoFe/20 Å Cu/(10 Å CoFe—20 Å NiFe)/10 Å Cu/20 Å Ta 50 Å TaN/65 Å NiCr/175 Å MnPt/19 Å CoFe/7.5 Å Ru/21 Å CoFe/20 Å

Cu/(8 Å CoFe—16 Å NiFe)/5 Å Cu/20 Å Ta where OL indicates in situ plasma oxidation of 20 Å Ta to form a 50 Å thick $Ta_2O_5$ D1 layer. The free layer thickness for the 100 Gb/in$^2$ density GMR is less than 38 Å NiFe (20 Å CoFe). The GMR performance properties are shown in TABLE I:

TABLE I

| Structure: NiFe 82%, MnPt 43% | Bs | Hc | He | Hk | Rs | Dr/r | Dr |
|---|---|---|---|---|---|---|---|
| CZB55/MP150/CoFe18/Ru7.5/CoFe23/Cu20/CoFe10/NiFe20/Cu10/Ta20 | 0.27 | 5.9 | 8.5 | 4.1 | 15.9 | 12.8 | 2.0 |
| 50ÅTaO/Ta15/CZB65/MP150/CoFe18/Ru7.5/CoFe23/Cu20/CoFe10/NiFe20/Cu10/Ta20 | 0.26 | 8.3 | 8.0 | 6.8 | 15.9 | 12.2 | 1.9 |
| CZB55/MP120/CoFe19/Ru7.5/CoFe21/Cu20/CoFe8/NiFe16/Cu5/Ta20 | 0.20 | 10.7 | 4.7 | 2.0 | 18.1 | 12.2 | 2.2 |
| TaN 50/CZB65/MP120/CoFe19/Ru7.5/CoFe21/CU2o/CoFe8/NiFe16/Cu5/Ta20 | 0.22 | 11.2 | 4.8 | 2.0 | 18.1 | 12.2 | 2.2 | where
Bs = free layer magnetic moment,
Hc = coercivity,
He = interlayer coupling field,
Hk = anisotropy field,
Rs = GMR sheet resistance,
CZB = NiCr It can be seen that the bottom spin valve formed on the TaO or TaN is equivalent to that formed on the $Al_2O_3$ D1. The magnetostriction of the above bottom spin valve structures is around $1-2 \times 10^{-6}$. The sheet resistance of the Exchange/Lead overlay structure is determined by forming the following lead overlay structure:

100 Å MnPt/30 Å NiCr/X Cu/25 Å Ta.

Here, the Cu overlay is deposited on NiCr to obtain low sheet resistance. The results are shown in TABLE II:

TABLE II

| Exchange/Lead overlay structure | Rs, ohm/sq | Rs (GMR) = 17/ Rs (lead overlay) |
|---|---|---|
| 30Å NiFe/100Å MnPt/30Å NiCr/100Å Cu/25Å Ta | 5.15 | 3.3 |
| 30Å NiFe/100Å MnPt/30Å NiCr/150Å Cu/25Å Ta | 2.82 | 6 |
| 30Å NiFe/100Å MnPt/30Å NiCr/200Å Cu/25Å Ta | 1.88 | 9 |

For a 150 Å Cu lead overlay, the resistance aspect ratio between the GMR and Exchange/Lead Overlay is around 6.0. Thus, the exchange/lead overlay is a low resistance path for conducting the sensor current.

While the invention has been particularly shown and described with reference to the preferred embodiments thereof, it will be understood by those skilled in the art that various changes in form and details may be made without departing from the spirit and scope of the invention.

What is claimed is:

1. A magnetic read head, comprising:
a bottom magnetic shield;
on said bottom magnetic shield, a first layer of aluminum oxide between about 80 and 120 Angstroms thick;
on the first layer of aluminum oxide, a first layer of an insulating material having a thickness between about 40 and 60 Angstroms and a dielectric breakdown voltage that is as least 5 times that of aluminum oxide, said first aluminum oxide layer and the high voltage breakdown layer together constituting a lower dielectric layer whose total thickness is less than about 150 Angstroms;
on the lower dielectric layer, a spin valve structure;
on said spin valve structure a second layer of an insulating material having a thick-ness between about 40 and 60 Angstroms and a dielectric breakdown voltage that is at least 5 times that of aluminum oxide;
on the second high voltage breakdown layer, a second layer of aluminum oxide having a thickness between about 80 and 120 Angstroms, the second aluminum oxide layer together with said second high breakdown layer constituting an upper dielectric layer whose thickness is between about 140 and 160 Angstroms; and
on the upper dielectric layer, an upper magnetic shield layer whereby the magnetic read head has a minimum separation between its upper and lower magnetic shields that is less than 700 Angstroms.

2. The read head described in claim 1 wherein the high breakdown voltage breakdown material is selected from the group consisting of tantalum oxide, tantalum nitride, aluminum nitride, and zirconium oxide.

3. A magnetic read head, comprising:
a lower magnetic shield layer;
on said lower magnetic shield layer, a first layer of aluminum oxide having a thickness between about 80 and 120 Angstroms;
on the first layer of aluminum oxide, a first layer of tantalum oxide having a thickness between about 40 and 60 Angstroms, whereby the first aluminum oxide and tantalum oxide layers constitute a lower dielectric layer whose total thickness is less than about 150 Angstroms;
on the lower dielectric layer, a first layer of nickel-chromium;
on the first layer of nickel-chromium, a four layer laminate, whose bottom layer is manganese platinum, that is a synthetic anti-ferromagnet suitable for use as a pinned layer in a spin valve;
on said pinned layer, a layer of non-magnetic material;
on said non-magnetic layer, a three layer laminate that serves as a free layer in said spin valve;
a pair of parallel first trenches that are separated by a first distance and that extend downwards part way through the free layer;
only on the free layer inside the first trenches, additional free layer material;
only on the free layers inside the first trenches, a layer of antiferromagnetic material;
only on the layer of antiferromagnetic material, a second layer of nickel-chromium, said antiferromagnetic and second nickel chromium layers serving to provide longitudinal bias for the spin valve;
only on the second layer of nickel chromium, a conductive layer, said antiferromagnetic, second nickel chromium and conductive layers being disposed so as to have parallel, inward-looking, sloping sidewalls;
only on said sidewalls and second copper layer, a second layer of tantalum between about 20 and 30 Angstroms thick;
parallel to the first trenches, a pair of second trenches separated from each other by a second distance that is greater than said first distance, extending downwards into said manganese-platinum layer and filled with material suitable for use as conductive leads;
over the conductive leads, the second tantalum oxide layer, a second layer of aluminum oxide between about 80 and 120 Angstroms thick; and on the second aluminum oxide layer, an upper magnetic shield layer whereby there is a minimum separation between the upper and lower magnetic shields that is less than 700 Angstroms.

4. The read head described in claim 3 wherein said four layer laminate consists of between about 20 and 25 Angstroms of cobalt iron which is on between about 6 and 9 Angstroms of ruthenium which is on between about 15 and 20 Angstroms of cobalt iron which is on between about 100 and 150 Angstroms of manganese platinum.

5. The read head described in claim 3 wherein said three layer laminate consists of between about 5 and 10 Angstroms of copper which is on between 15 and 20 Angstroms of nickel iron which is on between about 5 and 10 Angstroms of cobalt iron.

6. A magnetic read head, comprising:

a lower magnetic shield layer;

on said lower magnetic shield layer, a first layer of aluminum oxide having a thickness between about 80 and 100 Angstroms;

on the first layer of aluminum oxide, a layer of tantalum nitride having a thickness between about 40 and 60 Angstroms, whereby the first aluminum oxide and tantalum nitride layers constitute a lower dielectric layer whose total thickness is less than about 150 Angstroms;

on the lower dielectric layer, a first layer of nickel-chromium;

on the first layer of nickel-chromium, a four layer laminate, whose bottom layer is manganese platinum, that is a synthetic anti-ferromagnet suitable for use as a pinned layer in a spin valve;

on said pinned layer, a layer of non-magnetic material;

on said non-magnetic layer, a three layer laminate that serves as a free layer in said spin valve;

a pair of parallel first trenches that are separated by a first distance and that extend downwards part way through the free layer;

only on the free layer inside the first trenches, additional free layer material;

only on the free layers inside the first trenches, a layer of antiferromagnetic material;

only on the layer of antiferromagnetic material, a second layer of nickel-chromium, said antiferromagnetic and second nickel chromium layers serving to provide longitudinal bias for the spin valve;

only on the second layer of nickel chromium, a conductive layer, said antiferromagnetic, second nickel chromium and second copper layers being disposed so as to have parallel, inward-looking, sloping sidewalls;

only on said sidewalls and conductive layer, a layer of tantalum between about 25 and 30 Angstroms thick;

parallel to the first trenches, a pair of second trenches separated from each other by a second distance that is greater than said first distance, extending downwards into said manganese-platinum layer and filled with material suitable for use as conductive leads;

over the entire structure, a second layer of tantalum oxide between about 40 and 60 Angstroms thick; and on the second tantalum oxide layer second aluminum oxide layer, between about 80 and 120 Angstroms thick, an upper magnetic shield layer whereby there is a minimum separation between the upper and lower magnetic shields that is less than 700 Angstroms.

7. The read head described in claim 6 wherein said four layer laminate consists of between about 10 and 25 Angstroms of cobalt iron which is on between about 6 and 8 Angstroms of ruthenium which is on between about 15 and 20 Angstroms of cobalt iron which is on between about 100 and 150 Angstroms of manganese platinum.

8. The read head described in claim 6 wherein said three layer laminate consists of between about 5 and 10 Angstroms of copper which is on between about 15 and 20 Angstroms of nickel iron which is on between about 5 and 10 Angstroms of cobalt iron.

* * * * *